United States Patent
Samayamantry et al.

(10) Patent No.: US 7,433,360 B2
(45) Date of Patent: Oct. 7, 2008

(54) VIRTUAL PRIVATE COMMUNICATIONS NETWORK

(75) Inventors: Mallik Samayamantry, Boca Raton, FL (US); Luiz Henrique Domingos, Boca Raton, FL (US); Nissim Ozery, Parkland, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 1077 days.

(21) Appl. No.: 10/283,837

(22) Filed: Oct. 30, 2002

(65) Prior Publication Data

US 2004/0085971 A1  May 6, 2004

(51) Int. Cl.
*H04L 12/28* (2006.01)
*H04Q 7/20* (2006.01)

(52) U.S. Cl. .................... 370/401; 455/435.2

(58) Field of Classification Search .............. None
See application file for complete search history.

(56) References Cited

U.S. PATENT DOCUMENTS

| | | | |
|---|---|---|---|
| 5,758,291 A * | 5/1998 | Grube et al. .............. 455/518 |
| 5,943,619 A | 8/1999 | Coyne et al. |
| 6,118,772 A | 9/2000 | Giordano et al. |
| 6,141,562 A * | 10/2000 | Eriksson .................. 455/555 |
| 6,181,935 B1 | 1/2001 | Gossman et al. |
| 6,185,425 B1 * | 2/2001 | Lindgren et al. .......... 455/445 |
| 6,301,474 B1 | 10/2001 | Hartmaier et al. |
| 6,308,267 B1 | 10/2001 | Gremmelmaier |
| 6,330,442 B1 * | 12/2001 | Seppanen ................. 455/426.1 |
| 6,351,464 B1 | 2/2002 | Galvin et al. |
| 6,373,857 B1 | 4/2002 | Ma |
| 6,445,922 B1 | 9/2002 | Hiller et al. |
| 6,449,491 B1 * | 9/2002 | Dailey ..................... 455/518 |
| 6,480,715 B1 * | 11/2002 | Pentikainen ............... 455/433 |
| 6,510,327 B1 * | 1/2003 | Jung et al. ................ 455/575.1 |
| 2003/0081565 A1 * | 5/2003 | McIntosh et al. ........... 370/328 |
| 2003/0181209 A1 * | 9/2003 | Forte ...................... 455/445 |

FOREIGN PATENT DOCUMENTS

WO  WO 01/35616  5/2001

OTHER PUBLICATIONS

Avaya "'No Compromises' Remote Worker Communications" pp. 1-4, Oct. 2001.
Avaya "Solutions for Collaboration—Speed Market Expansion", www.1.avaya.com/enterprise/solutions/manufacturing/solutions4.html, 2002.
"top 10 Benefits of Definity Wireless Business Systems", www.1.avaya.com/enterprise/who/docs/DWBS_Top_10.doc, Mar. 7, 2001.

* cited by examiner

*Primary Examiner*—Andrew Lee

(57) ABSTRACT

A virtual private communications network (VPCN) and method of managing calls on the network. Communications devices are networked together over a private communications network. Each VPCN communications device has a unique private network identification (ID) code and can be contacted by dialing its respective ID. At least one of the VPCN communications devices is a wireless communications device, e.g., a cell phone, connected through a public wireless network to the private communications network. Calls to and from each such wireless device pass through the private communications network.

20 Claims, 3 Drawing Sheets

VIRTUAL PRIVATE COMMUNICATIONS NETWORK

BACKGROUND OF THE INVENTION

1. Field of the Invention

The present invention is related to private communications networks and more particularly, to integrating wireless communication devices on a public wireless network to a private communications network.

2. Background Description

A private communications network, such as a private voice network, is a full featured local telephone network. A typical private communications network may include, for example, a communications server or private branch exchange (PBX) server linking together wire connected digital phones for a particular enterprise, e.g., phones located in offices on a common campus. The digital phones may be cordless to allow some mobility within a specific local area and sometimes are Internet protocol (IP) based for easy expansion, e.g., simply by connecting extra IP phones. Local users can share both data and voice based information across the private network to improve productivity. Thus, such a private communications network provides user mobility and easy access for telecommuting, as well as low cost from using minimizing external lines.

On a typical such private communications network, some phones may have a direct line with a dial in direct (DID) number and others may be accessible as extensions from a main number or switchboard number. The main number may be answered by a voice menu or receptionist. Each phone has its own unique identification on the network, i.e., its own in network phone number. Point to point calling within the network is normally done by dialing an abbreviated number string, one to five digits long. Dialing an out of network number may be a two step process of first dialing out (e.g., dialing 9) and then dialing the number of the party being called. Dialing into the private communications network may entail dialing the main number to get the private network dial tone or voice menu and then, dialing the called party's extension.

Public wireless communications networks such as cellular or cell phone networks provide a wide mobility range, typically nationwide. Each cell phone has its own unique phone number. To connect to a cell phone, the caller dials a number just like calling someone on a land line connected to the plain old telephone system (POTS). Thus, normally, a caller dials seven to ten digits for a local cell phone number and eleven or more for a long distance number. Likewise the cell phone caller dials seven to ten digits for a local number and eleven or more for a long distance number.

Currently, remote users can connect over a high speed link (e.g., over a high speed broadband connection such as a Digital Subscriber Line (DSL) or a cable modem line) to the communications server using a personal computer (PC) to seamlessly communicate with other connected users. However, for access to all of the communications server features, a broadband connection must be available just to use VoIP in a proprietary client application from a remote PC. Unfortunately, broadband is far from being universally available and seldom available to travelers. When broadband is not available, the only access to the communications server is with a modem over a public switching telephone network (PSTN) and remote users still cannot access all of the private communications network features. At best, a cell phone connection to the private communications network is no different than any other incoming call and has little access to any of the private communications network features.

Thus, there is a need to extend private communications networks beyond the physical range of wire connected devices, especially to distant users connecting through a public wireless connection and especially, to make private communications network features available to wireless users.

SUMMARY OF THE INVENTION

It is a purpose of the invention to extend the range of private communications networks;

It is another purpose of the invention to simplify connecting to private communications network users by remote or distantly located users;

It is yet another purpose of the invention to simplify connecting to remote or distantly located users by private communications network users.

It is yet another purpose of the invention to provide remote or distantly located users with all private communications network features.

The present invention relates to a virtual private communications network (VPCN) and method of managing calls on the VPCN. Communications devices are networked together over a private communications network. Each VPCN communications device has a unique private network identification (ID) code and can be contacted by dialing its respective ID. At least one of the VPCN communications devices is a wireless communications device, e.g., a cell phone, connected through a public wireless network to the private communications network. Calls to and from each such wireless device pass through the private communications network.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
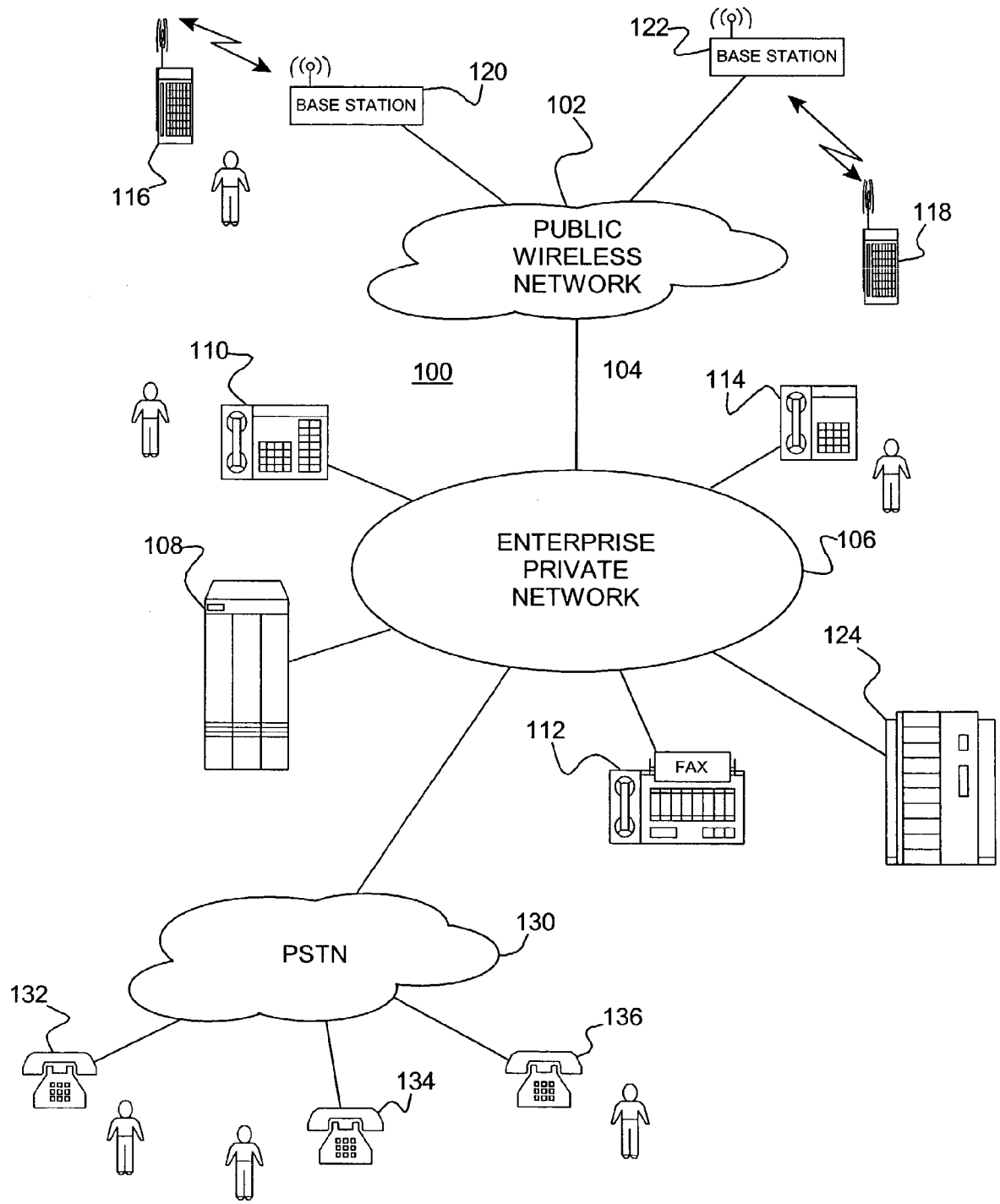
FIG. 1 shows an example of a preferred embodiment virtual private communications network.

Turning now to the drawings and more particularly, FIG. 1 shows an example of a preferred embodiment virtual private communications network (VPCN) 100. VPCN wireless users connect from a public wireless network 102 over a high speed digital connection 104 to an Enterprise Private Network (EPN) 106. The high speed digital connection 104 between public wireless network 102 and EPN 106 may be an integrated services digital network (ISDN) line, for example. The EPN 106 includes one or more communications network servers 108, e.g., a private branch exchange (PBX), managing private communications over the EPN 106 to digital communications devices at individual EPN stations 110, 112, 114. VPCN wireless devices 116, 118, e.g., cell phones, connect to the public wireless network 102 through remotely located base stations 120, 122. A mobility server 124 on the EPN 106 contains contact information to all VPCN wireless devices. Typically, a preferred VPCN 100 is connected to a public switched telephone network (PSTN) 130 for external communication with other PSTN clients 132, 134, 136.

As with a typical state of the art private voice network, each EPN station 110, 112, 114 has an individual EPN number, specifically identifying the respective EPN station 110, 112, 114, i.e., a dial in direct (DID) number or an extension. Additionally, however, VPCN wireless devices 116, 118 are virtual stations of the EPN 106, forming an Enterprise Virtual Group (EVG) or an Enterprise Virtual Wireless Group (EVWG). Like EPN stations 110, 112, 114, each of the EVWG members 116, 118 has an individual unique network identification code (ID) on the network, i.e., a unique VPCN extension or DID.

EVWG users, e.g., at VPCN wireless device 116, dial the appropriate VPCN extension to connect to other VPCN stations 110, 112, 114, 118 though their particular public wireless service provider (PWSP) in a single dialing step. Also, each EVWG call is identified by a two or three digit unique code or tag, an Enterprise Virtual Group Code (EVGC), that identifies the call as being an in network call to a particular EPN 106. When an EVWG call reaches the EPN 106, the mobility server 124 strips off the EVGC and passes the call to the communications server 108, which then handles the call as it would any other EPN 106 originated call. Stations 110, 112, 114 connect to EVWG user stations 116, 118 through the PWSP by dialing only the designated VPCN extension. In addition, out of network VPCN calls, whether from EVWG users or from EPN stations 110, 112, 114, pass through the EPN 106 to the PSTN 130 and then, to the particular PSTN client 132, 134, 136.

Thus, for example, an enterprise may have a subscriber agreement with the PWSP, identifying members to a specific EVWG. The PWSP configures each identified active wireless device as a node on the VPCN and identifies each device as belonging to the EVWG. The mobility server 124 assigns each EVWG member to a virtual port on the EPN 106. The virtual port assignment establishes the EVWG member connection to the EPN 106 and VPCN features for the particular EVWG member including: extension number, preprogrammed buttons, feature functionality, Class of Service and Call Accounting. Once assigned to a virtual port, a particular connected wireless device 116, 118, essentially, acts as any other EPN station 110, 112, 114.

Preferably, every virtual port has a DID extension number on the communication server 108. Thus, in this example the VPCN 100 includes devices 116, 118 at virtual ports. Each of VPCN stations 110, 112, 114, 116, 118 may have two digit VPCN extensions, e.g., 10, 12, 14, 16 and 18, and DID numbers, e.g., 555-3410, 555-3412, 555-3414, 555-3416 and 555-3418, respectively.

Whether external or internal to the VPCN 100, calls made to a particular DID pass through the EPN 106, over the high speed trunk 104, to the public wireless network 102, where the PWSP directs each call to the particular wireless device 116, 118. Optionally, the PWSP may assign VPCN wireless devices an out of VPCN number, such that separate calls can be made and passed directly to same wireless device 116, 118 as they would normally. So for example, wireless devices 116, 118 may also have out of network numbers, e.g., 234-7726 and 548-9814, and may be reachable through both numbers. The PWSP passes the calls placed from an EVWG member, e.g., at wireless station 116, over the high speed trunk 104 to the EPN 106, where the mobility server 124 strips off the EVGC, if included, and passes the call to the mobility server 108. The mobility server 108 directs the call to an appropriate VPCN node 110, 112, 114, 118 or to the PSTN 130.

It is understood that although the VPCN 100 of this example is shown as including only one each of the communications server 108 and mobility server 124, this is for example only and not intended as a limitation. Any suitable number of each of communications server 108 and mobility server 124 may be included. Further, a single device may provide the function of both communications server 108 and mobility server 124. Further, VPCN wireless devices need not be from a single PWSP, provided the same unique EVGC is assigned to all wireless devices from any one PWSP group, i.e., wireless devices from each PWSP may belong to an EVWG for that particular PWSP. Also, wireless devices from one PWSP need not be grouped into one group and identified by the same EVGC, but may be spread amongst several groups, each group as small as one member and identified by a unique EVGC.

Figure 2:
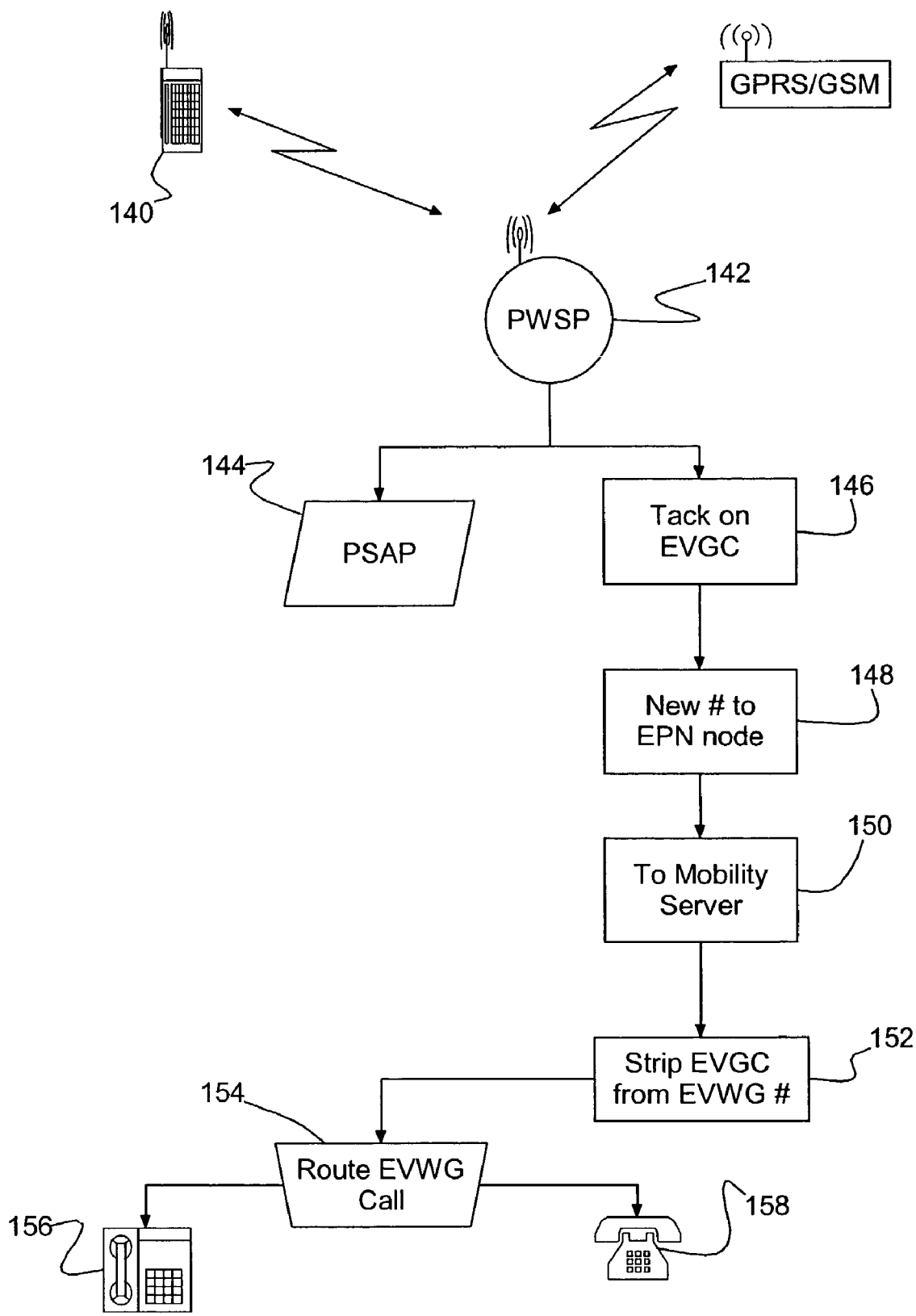
FIG. 2 shows an example of how outgoing wireless calls from a cell phone or other mobile device are passed by a PWSP to the VPCN and routed to the called party.

FIG. 2 shows an example of how outgoing wireless VPCN calls from a cell phone or other mobile device 140 are handled by a PWSP 142, depending upon whether the connection is a request for data services, a normal voice call or an emergency call. For an emergency call to a public safety answering point (PSAP), i.e., a 911 call to an emergency call answering service, the PWSP 142 bypasses the VPCN and places the call directly to the local PSAP 144. A request for data services, e.g., general packet radio system (GPRS) or global system for mobile communications (GSM), is outside of the VPCN and provided directly to the user, regardless of whether the station belongs to an EVWG. Otherwise, for a VPCN call, in step 146 the PWSP appends the EVGC to the dialed number creating a new, unique "called number" digit string or VPCN number.

In step 148 the PWSP routes the VPCN call with the appended string through a high speed digital trunk to the nearest EPN node. At the receiving EPN node, the private communications server recognizes the EVGC and routes the call to the mobility server in step 150 which handles all EVWG originated calls. The mobility server, recognizing by the EVGC that the call is from an EVWG member, strips off the EVGC from the incoming VPCN number in step 152 to recover the original called number digit string. Then, in step 154 mobility server redials the original called number, connecting the caller through to the identified EPN user port 156 or through the PSTN to an external number 158.

Figure 3:
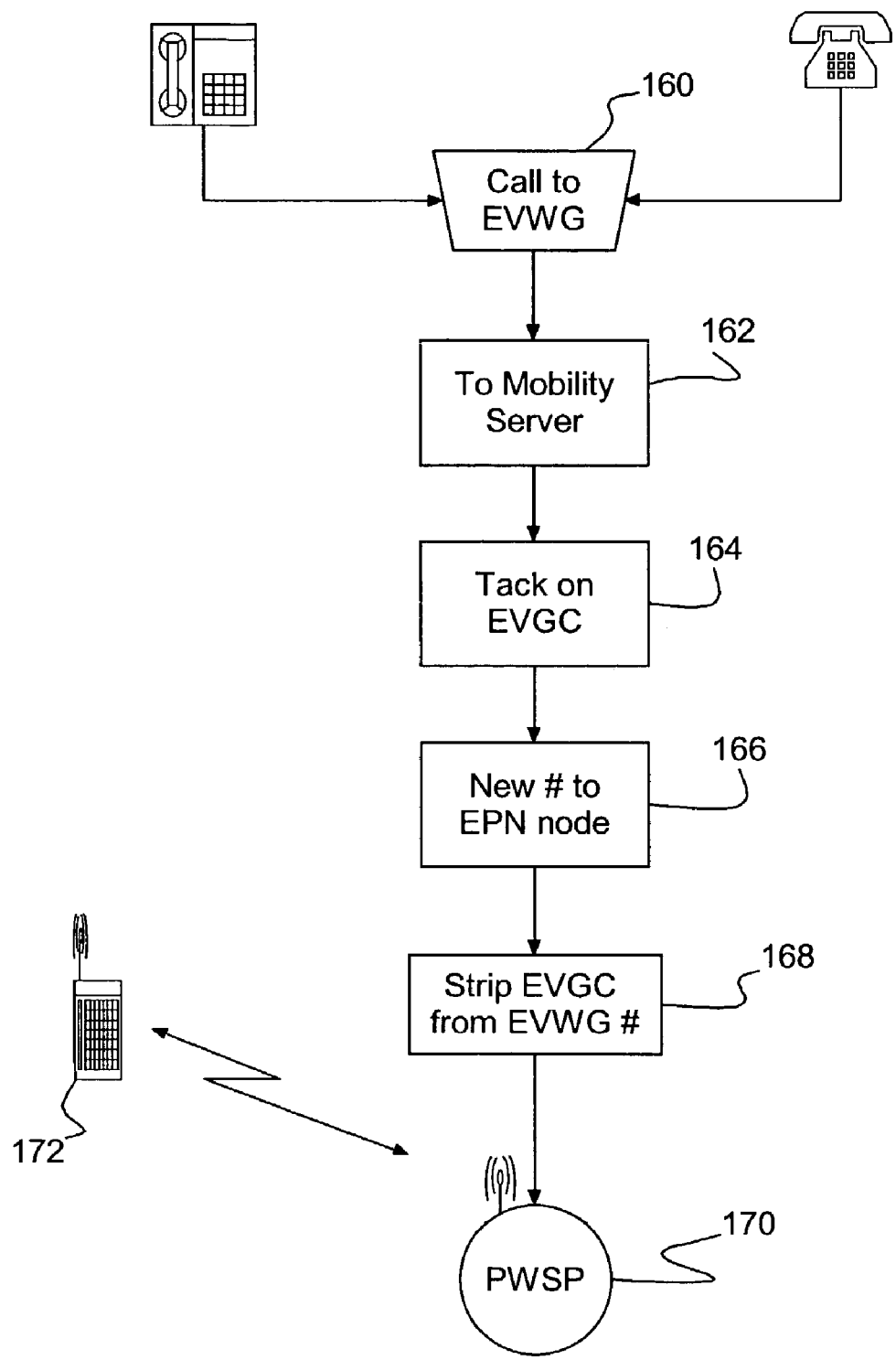
FIG. 3 shows an example of how VPCN calls are made to an EVWG member.

As shown in FIG. 3, VPCN calls to an EVWG member follow, roughly, the reverse path. Regardless of origination point, in step 160 the communications server recognizes a call by its called number as being directed to the extension/DID number of an EVWG station. The communications server forwards the call to the mobility server in step 162. Then in step 164, mobility server attaches the appropriate EVGC to the dialed number and forwards the VPCN number to the PWSP. In step 166, the mobility server passes the call over the high speed digital trunk to the public wireless network. In step 168, the PSWP 170 strips the EVGC and routes the call to the appropriate wireless station 172.

Thus, the present invention extends private communications networks beyond the physical range of state of the art private communications networks to PWSP cell phone users connecting through a public wireless network. Wireless stations have virtual connections to the private communications network and so, appear identical to other network devices. So, whether a cell phone with a virtual connection is across the room, across the street, across the city or across the country, the cell phone connects to other VPCN clients by dialing the short in network number and, likewise, is contacted by other VPCN clients by dialing the cell phone's short in network number.

While the invention has been described in terms of preferred embodiments, those skilled in the art will recognize that the invention can be practiced with modification within the spirit and scope of the appended claims.

What is claimed is:

1. A virtual private communications network comprising:
   a private communications network connected to a public wireless network and including a plurality of ports, each of said plurality of ports identified by a unique private communications network identification (ID) code, said plurality of ports including at least one virtual port;
   a plurality of communications devices, each connected to one of said plurality of ports and networked together over said private communications network, each of said plurality of communications devices being contacted by selecting a respective said private communications network ID, ones of said plurality being directly connected to a respective one of said plurality of ports; and
   at least one of said plurality of communications devices being a wireless communications device connected to a virtual port on said private communications network through said public wireless network.

2. A virtual private communications network as in claim 1, wherein at least one other of said plurality of communications devices is wire connected to a port on said private communications network.

3. A virtual private communications network as in claim 1, wherein said at least one wireless communications device is one of a plurality of wireless communications devices, connected to a respective virtual port on said private communications network through said public wireless network and said plurality of communications devices further comprises:
   a plurality of said other communications devices wire connected to respective ports on said private communications network, said plurality of communications devices contacting each other by providing an abbreviated ID.

4. A virtual private communications network as in claim 1 wherein said private communications network ID for each said wireless communications device is a dial in direct (DID) number on said private communications network.

5. A virtual private communications network as in claim 1 wherein out of network calls from each said wireless communications device pass through said private communications network.

6. A virtual private communications network as in claim 1 further comprising:
   a communications network server managing said private communications network; and
   a mobility server managing a wireless communications between each said wireless device and said communications network server.

7. A virtual private communications network as in claim 6 wherein each call placed from said each wireless device contains a code identifying said each call as originating from said each wireless device, said code being removed by said mobility server.

8. A virtual private communications network comprising:
   a private communications network connected to a public wireless network and including a plurality of ports, each of said plurality of parts identified by a unique private communications network identification (ID) code, said plurality of ports including at least one virtual port;
   a plurality of communications devices, each connected to one of said plurality of ports and networked together over said private communications network, each one of said plurality of communications devices contacting others of said plurality of communications devices by providing an abbreviated ID
   a communications network server managing said private communications network;
   at least one of said plurality of communications devices being a wireless communications device connected to a virtual part on said private communications network through a public wireless network; and
   a mobility server managing connection of each said wireless device through said private communications network.

9. A virtual private communications network as in claim 8 wherein said wireless communications device is one of a plurality of wireless communications devices, each connected to a respective virtual port on said private communications network through said public wireless network, calls to and from said plurality of wireless devices having a group code attached to dialed numbers said group code indicating to said communications server and said mobility server that incoming said calls originated from ones of said plurality of wireless communications devices.

10. A virtual private communications network as in claim 9 wherein at least one of said plurality of wireless communications devices is a cell phone.

11. A virtual private communications network as in claim 10 wherein each said cell phone has a dial in direct (DID) number on said private communications network, every call made from said each cell phone passing through said public wireless network to said private communications network.

12. A virtual private communications network as in claim 9 wherein said mobility server attaches said group code to called numbers forming VPCN numbers for private communications network calls intended for said plurality of wireless communications devices, said private communications network calls being forwarded to corresponding said VPCN numbers.

13. A virtual private communications network as in claim 11 wherein said communications server is a private branch exchange (PBX) server and at least one of said plurality of communications devices is wire connected to said PBX, wherein wire connected communications devices are directly connected network devices and said wireless communications device is an indirectly connected virtual network device.

14. A virtual private communications network as in claim 13 wherein said private communications network is connected to said public wireless network over a high speed digital trunk and all communications with indirectly connected virtual network devices pass over said high speed digital trunk.

15. A method of managing wireless calls, said method comprising the steps of:
   a) checking whether a call originates from a member of a selected group, members of said selected group being communications devices identified as virtual devices belonging to a private communications network;
   b) attaching a group code to form a VPCN number for each said call determined to originate from a group member;
   c) forwarding each call having a VPCN number to said private communications network as an in-network private communications network call;
   d) checking in-network private communications network calls for a VPCN number, any said in-network private communications network calls having a VPCN number being provided to a mobility server; and
   e) stripping said group code from said VPCN number and forwarding each stripped call to a called party.

16. A method of managing wireless calls as in claim 15, wherein before the checking step (a) said method further comprises:

checking whether said call is an emergency call, any identified emergency call being provided immediately, directly from a public wireless network to a public safety answering point.

17. A method of managing wireless calls as in claim 15, wherein before the checking step (a) said method further comprises:

checking whether said call is a request for data services, any identified request for data services being provided immediately, directly from a public wireless network to a data service provider.

18. A method of managing private communications network calls, said private communications network including communications devices both directly connected to network ports and indirectly connected to virtual network ports, said method comprising the steps of:

a) checking whether an in-network call is directed to a wireless device group member identified as a virtual device;

b) providing each said call directed to one said wireless device group member to a mobility server;

c) attaching a group code to form a VPCN number to each provided said call;

d) forwarding every said call having a VPCN number to an identified private wireless communications service provider; and e) stripping said group code from said VPCN number at said identified private wireless communications service provider and forwarding each forwarded call to a respective indirectly connected virtual device identified with the called said wireless device group member.

19. A virtual private communications network as in claim 1, wherein at least one said wireless communications device is a cell phone and the public wireless network is a cell phone network.

20. A virtual private communications network as in claim 2, wherein at least one said wireless communications device is a cell phone and the public wireless network is a cell phone network.

* * * * *